United States Patent [19]

Toth

[11] 3,737,140
[45] June 5, 1973

[54] DUAL CONTROLLED VALVE ASSEMBLY

[75] Inventor: Alex Toth, Lincolnwood, Ill.

[73] Assignee: Ellis Corporation, Chicago, Ill.

[22] Filed: Sept. 7, 1971

[21] Appl. No.: 177,962

[52] U.S. Cl. .....................251/14, 251/63, 251/63.5, 251/367
[51] Int. Cl. ...........................................F16k 31/143
[58] Field of Search....................251/14, 62, 63, 63.5, 251/63.6, 367

[56] References Cited

UNITED STATES PATENTS

| | | | |
|---|---|---|---|
| 3,378,224 | 4/1968 | Boyle | 251/14 |
| 2,320,011 | 5/1943 | Reynolds | 251/14 X |
| 2,830,784 | 4/1958 | Placette | 251/14 |

FOREIGN PATENTS OR APPLICATIONS

| | | | |
|---|---|---|---|
| 347,397 | 8/1960 | Switzerland | 251/14 |
| 1,235,093 | 2/1967 | Germany | 251/63.5 |

*Primary Examiner*—Arnold Rosenthal
*Attorney*—Richard D. Mason, M. Hudson Rathburn and Philip M. Kolehmainen

[57] ABSTRACT

A dual controlled valve assembly comprising a body defining a valve chamber having a valve seat therein. An actuating chamber is provided adjacent the valve chamber, and detachable wall means defining port means therein separates the valve body and the actuating chamber. The valve member is carried in said chamber movable to open and close against the valve seat, and an elongated valve stem supporting the valve extends through the port means into the actuating chamber. Piston means is connected to the stem and mounted for movement in the actuating chamber between opposite ends for opening and closing the valve. Inlet means is provided for introducing pressurized fluid into at least one end of said actuating chamber for acting on the piston to move the stem in one direction. Biasing means urges the stem in an opposite direction, and manual operator means externally of the actuating chamber is provided for axially moving the stem against the force of the biasing means thereon between a first stable position exerting no force in opposition to said biasing means and a second stable position opposing said biasing means to maintain the valve member in a fixed position in relation to the valve seat.

7 Claims, 2 Drawing Figures

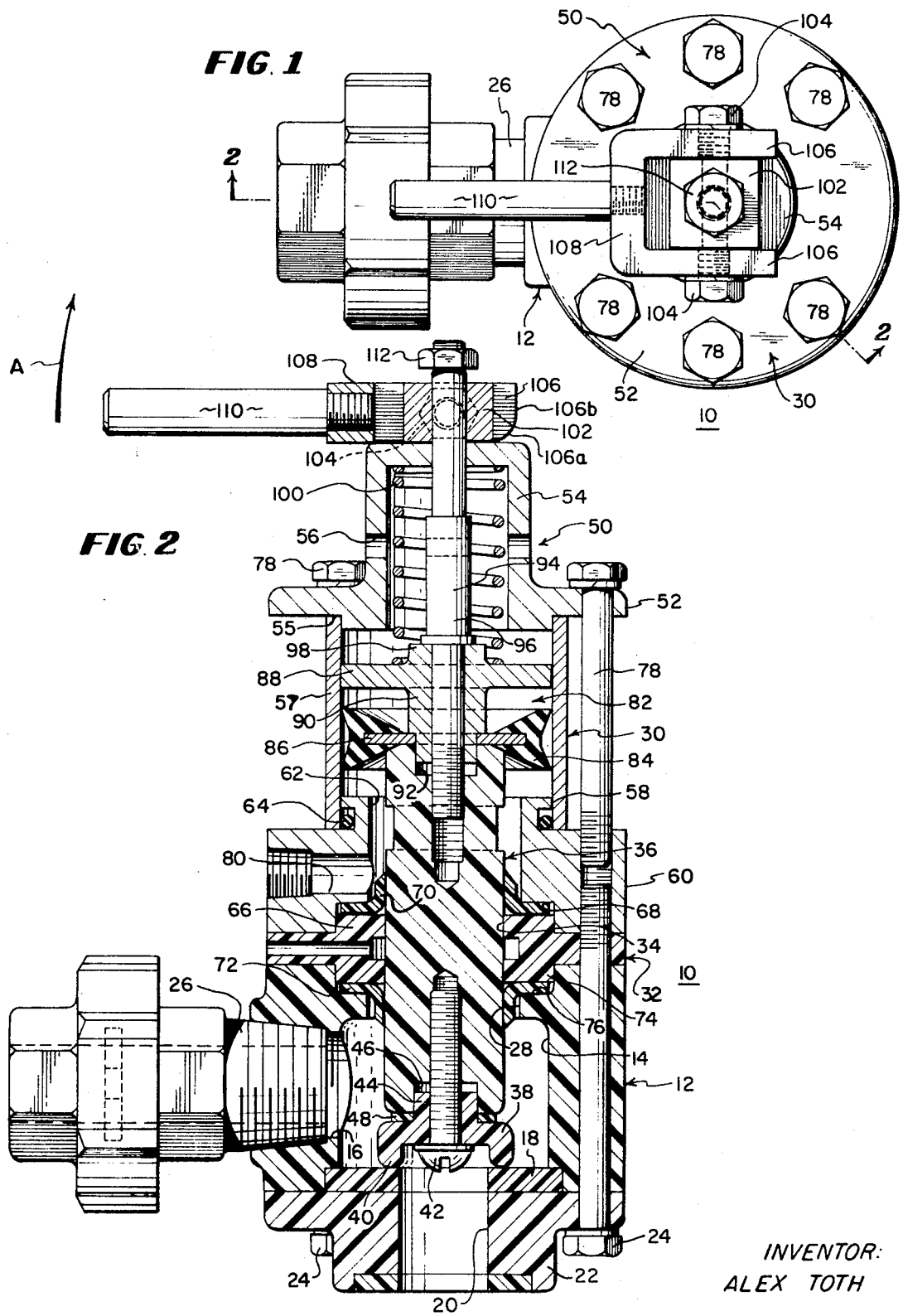

DUAL CONTROLLED VALVE ASSEMBLY

The present invention is directed towards a new and improved, dual controlled, valve assembly. More particularly, the invention is concerned with a dual controlled valve assembly which is specially adapted to be operated by remote control with pressurized fluid, such as pneumatic or hydraulic fluid, and an addition which includes manual operating means for local operation.

It is an object of the present invention to provide a new and improved valve assembly.

Another object of the invention is to provide a new and improved, dual controlled, valve assembly.

Still another object of the present invention is to provide a new and improved, dual controlled, valve assembly having a fluid operated actuator for remote operations and a manual operator for local valve operation.

Another object of the invention is to provide a new and improved valve assembly of the character described wherein a choice of operating mode is provided, both modes acting against a biasing means normally urging the valve member towards a selected normal position.

Another object of the present invention is to provide a new and improved valve assembly which is easy and reliable to operate at relatively low cost and one which is simple in structure and relatively maintenance free over a long, usable service life.

The foregoing and other objects and advantages of the present invention are accomplished in an illustrated embodiment which comprises a dual controlled valve assembly having a valve body defining therein a valve chamber with a valve seat. An actuating chamber is provided adjacent the valve chamber and detachable wall means defining a port therein is mounted between the valve body and the actuating chamber. The valve member is mounted in the chamber to open and close with respect to the valve seat, and an elongated valve stem supports the valve member and extends into the actuating chamber through the port. Piston means is provided on the stem for movement in the actuating chamber between opposite ends for opening and closing the valve. Inlet means supplies pressurized fluid into at least one end of the actuating chamber for moving the piston means to open or close the valve. Biasing means normally urges the valve stem in an opposite direction, and manual operating means externally of the operating chamber is provided for axially moving the valve stem against the force of the biasing means between a first and stable position and a second stable position wherein the biasing means is overcome and the valve member is maintained in a fixed position relative to the valve seat.

For a better understanding of the present invention, reference should be had to the following detailed description taken in conjunction with the drawing, in which:

FIG. 1 is an end elevational view of a new and improved valve assembly constructed in accordance with the invention; and FIG. 2 is a cross-sectional view through the valve assembly taken substantially along line 2—2 of FIG. 1.

Referring now, more particularly, to the drawings, therein is illustrated a new and improved, dual controlled, valve assembly, generally referred to by the reference numeral 10 and constructed in accordance with the features of the present invention. The valve assembly 10 includes a valve body 12 defining a valve chamber 14 therein having an inlet opening 16 at one side, an annular valve seat 18, and an outlet flow passage 20 defined in a closure member 22 secured to the lower face of the valve body by elongated cap screws 24. Water or other fluid controlled by the valve may be supplied to the valve chamber 14 through a suitable inlet conduit 26 threadedly received in the valve body adjacent the inlet opening 16.

In accordance with the invention, the valve chamber 14 is in communication with a fluid actuating chamber (generally indicated by the reference numeral 30) through a circular port 28 in the upper end of the valve body, which port is in coaxial alignment with the outlet passage 20 formed in the closure member 22. A wall or divider plate 32 is disposed between the lower end of the fluid actuating chamber 30 and the upper end of the valve body 12 (as illustrated in FIG. 2), and is held in sandwiched fashion therebetween by the cap screws 24. The wall plate is formed with a circular port 34 in coaxial alignment with the opening 28 in the valve body but slightly smaller in diameter, and the port is in direct communication with the lower end of the fluid actuating member 30.

The valve assembly 10 includes an elongated, generally cylindrical valve stem 36 which is axially movable and in coaxial alignment with the output passage 20 toward and away from the valve seat 18. The valve stem 36 is slidably disposed in the bore 34 of the wall plate 32 and extends axially upwardly into the fluid actuating chamber 30. On the lower end of the valve stem 36, there is provided an inverted cuplike valve member 38 having an annular depending sidewall 40, the lower rounded edges of which are adapted to seat against and sealingly encircle the outlet passage 20 on the upper surface of the valve seat 18 when in the closed position, as shown in FIG. 2. The valve member 38 is secured to the lower end of the valve stem by means of a cap screw 42 which is threadedly engaged in an axial bore provided in the valve stem 36. Preferably, the valve member is formed of deformable material to provide a fluid-tight seal when compressed against the upper surface of the valve seat 18.

As shown, the valve member includes an upwardly extending cylindrical boss portion 44 of reduced diameter which projects into a hollow recess 46 formed in the lower end of the stem and a washer 48 is provided around the boss 4 to seal between the valve member and the lower end of the stem. When the valve stem 36 is moved to a position spaced axially upwardly from the closed or seated position, as shown in FIG. 2, the lower rounded edge of the depending skirt 40 of the valve member 38 opens and permits fluid flow between the inlet passage 16 and outlet passage 20, or vice versa, depending on the pressure of the fluid.

In accordance with the present invention, the actuator chamber 30 includes an upper cap member 50 having a radial flange 52 at the lower end and an inverted cuplike housing or cap 54 formed with ports 56 in the sidewall thereof. The flange 52 is formed with an annular groove or shoulder 55 on the lower face thereof to receive and center in coaxial alignment therewith the upper end of a hollow, tubular, cylinder wall 57. The lower end of the cylinder 57 is seated in a shoulder or recess 58 formed on the upper face of a cylinder baseplate 60 of the actuator chamber. The baseplate 60 is provided with an enlarged bore 62 slightly larger in diameter than the stem 36 and in coaxial alignment with the stem and the bore 34 in the divider wall plate 32. An O-ring 64 is seated in a groove provided in the baseplate 60 to seal around the inside of the lower end of the cylinder wall 57.

In accordance with the present invention, the baseplate 60, the divider wall plate 32, and the valve body 12 are keyed or seated together in interlocking relation to insure precise coaxial alignment between the ports 28 and 34 and the cylinder 57 which receive the valve stem 36. For this purpose, the divider wall 32 includes an upwardly extending annular boss or projection 66 adapted to seat within a downwardly facing recess or shoulder 68 formed on the lower side of the cylinder baseplate 60. An annular sealing gasket or flexible washer 70 of resilient material is mounted to seal against the outer surface of the movable valve stem 36 and is secured in place between the upper surface of the boss 66 and the lower, downwardly facing surface of the recess 68. The gasket or sealing washer 70 provides a continuous fluid-tight seal adjacent the lower end of the fluid actuating chamber 30 around the valve stem 36.

A similar sealing gasket 72 is provided to seal around the stem 36 at the upper end of the valve chamber 14 and is seated between the lower surface of a downwardly projecting annular boss 74 formed on the wall plate 32, which boss is seated within an upwardly facing recess or shoulder 76 formed on the upper surface of the valve body 12 in coaxial alignment with the port 28.

From the foregoing, it will be seen that the fluid actuating chamber 30 and the valve body 12 are positively keyed or interlocked together by means of the oppositely extending projections 66 and 74 on the divider wall plate 32 in cooperation with the recesses 68 and 76 formed in the cylinder baseplate 60 and the valve body 12, respectively. The flexible seal gaskets 70 and 72 insure sealing around the stem between the lower end of the fluid actuating chamber 30 and the upper end of the valve chamber 14 as the valve stem is moved toward and away from the valve seat 18.

The cap screws 24 project upwardly into threaded engagement with the baseplate 60 of the fluid actuating chamber 30 and permit ready detachment and reattachment of the valve body 12, divider plate 32, and cylinder base 60 when desired. The cap member 50 of the fluid actuator chamber 30 is secured to the base 60 by a plurality of cap screws 78 which extend downwardly through holes provided in the flange 52 into threaded engagement in the upper end portion of the same threaded apertures in the base 60, which receive the cap screws 24. Accordingly, the cylinder wall 57 and cap 50 are readily attachable to and detachable from the base 60 and connected structure of the valve assembly simply by loosening the cap screws 78.

In accordance with the present invention, means is provided for moving the valve stem 36 to open the valve by the introduction of pressurized fluid into the lower end of the actuation chamber 30 through an inlet passage 80 defined in the base 60, which passage radially intersects the bore 62 adjacent its lower end. Because the bore 62 is slightly larger in diameter than the stem 36, the pressurized fluid introduced through the inlet passage 80 freely moves upwardly into the lower end of the cylinder wall 57. This pressurized fluid acts upon a piston assembly 82 mounted on the stem 36 for sliding action within the cylinder wall 57. The piston assembly 82 includes a piston 84 of resilient material having an annular outer rim generally triangular-shaped in cross section with outer edge surfaces adapted to slide and seal against the inside surface of the cylinder wall 57. The piston 84 is formed with a recess in the interior bore thereof in order to receive a stiffening washer 86 secured to the upper end of the stem 36 on a depending, shouldered stem 90 having a reduced diameter lower end portion extending through the central opening in the stiffening washer. The stem 90 depends downwardly from a stop piston member 88 slidable in the cylinder wall 57 and the lower end of the stem is seated within an annular recess 92 formed in the upper end of the valve stem 36. The stop piston 88 is formed with an axial bore to receive the lower end portion of an elongated, relatively small diameter, valve actuating spindle 94 which extends downwardly through the cap assembly 50 and is threaded into an upper axial bore provided in the valve stem 36. The valve spindle 94 includes an intermediate, body portion 96 of enlarged diameter including an annular flange or shoulder on the lower end which bears against an upwardly extending, boss or projection 98 formed on the upper surface of the stop piston 88.

The stop piston 88 and valve stem 36 are biased downwardly toward a valve closing position wherein the valve member skirt 40 is seated against the upper surface of the annular valve seat 18 by means of a coaxially aligned compression spring 100 which is mounted around the spindle 94 in the upwardly extending cuplike portion 54 of the cap 50. The upper end of the spring bears against the upper end wall of the cuplike enclosure 54 of the cap while the lower end of the spring is centered by the projection 98 on the upper surface of the stop piston 88. Normally, the spring 100 acts to bias the valve member 38 into closed position against the valve seat 18. However, when fluid under pressure is introduced into the lower end of the cylinder wall 67 through the inlet passage 80 and bore 62, the fluid acts upwardly on the piston 84 to overcome the biasing force of the spring and lift the valve member 38 off the valve seat 18 to an open position, permitting fluid flow between the inlet passage 26 and outlet passage 20 via the valve chamber 14 in the valve body 12. When the pressure in the lower end of the actuator chamber 30 is reduced to normal or atmospheric conditions, the spring 100 closes the valve by downward biasing force on the valve stem 36.

The upper end portion of the spindle 94 extends upwardly through an opening in the top wall of the cuplike portion 54 of the cap 50 and projects through a vertical opening in a rectangular block 102 which is mounted for pivotal movement on the stem of one or more cap screws 104 which project through openings provided in the legs 106 of a U-shaped, valve actuator 108. The actuator is pivoted by a handle 110 attached to the bight portion thereof. The upper end portion of the valve spindle 94 is threaded to receive an adjustable stop nut 112, and when the handle 110 is pivoted upwardly in the direction of the arrow "A" (FIG. 2), the upper surface of the block 102 moves into engagement with the lower surface of the stop nut 112 before the lifting action of the valve spindle 94 occurs. Adjustment of the position of the nut 112 on the threaded portion at the upper end of the valve spindle 94 sets up and selects the amount of play in the valve handle 110 before manual valve opening occurs after pivotal movement of the handle is commenced in the direction of the arrow "A."

As viewed in FIG. 2, the lower, right-hand corners of the legs 106 of the U-shaped valve actuator 108 are rounded off on a curve as shown at 106a so that easy pivotal movement and lifting action occurs when the handle 110 is pivoted upwardly as illustrated. Manual actuation of the handle 110 causes the spindle 94 to be lifted upwardly, thereby causing the stem 36 and valve member 38 to open the valve against the bias of the spring 100. The upper portions of the outer end surfaces of the legs 106 are flat as at 106b, so that when the valve handle is pivoted into a fully upright position, the valve is then maintained in a stable condition in an open position by the action of the spring which urges the spindle 94 downwardly. This causes the block 102 to hold the surfaces 106b of the legs of the actuator 108 in engagement against the upper surface of the caplike portion 54 of the cap 50 until the handle is manually pivoted to the closed position.

From the foregoing, it will be seen that the valve assembly 10 can be fluid operated by the introduction of pressurized fluid into the lower end of the actuator cylinder 30 through the inlet passage 80 for remote control, or can be manually operated by moving the handle 110 from the horizontal position (as shown) upwardly into the upright position in which position the valve is retained in the open position until manually closed. Intermediate positions of the manual valve handle 110 can be used to provide partially open valve conditions, and these are maintained by continuous manual force on the handle 110 because of the force of the spring 100 which normally tends to close the valve.

Attachment or detachment of the actuator cylinder 30 and the valve body 12 is achieved by tightening or loosening the cap screws 24. The actuator cylinder is readily assembled or disassembled by tightening or loosening the cap screws 78. The divider plate 32 cooperates with the base 60 of the actuator cylinder and the valve body 12, along with the seal rings 70 and 72, to seal around the valve stem 36.

While there has been illustrated and described a single embodiment of the present invention, it will be appreciated that numerous changes and modifications will occur to those skilled in the art, and it is intended in the appended claims to cover all those changes and modifications which fall within the true spirit and scope of the present invention.

What is claimed as new and desired to be secured by Letters Patent of the United States is:

1. A valve assembly comprising a valve body defining a valve chamber having a fluid passage opening at one end; an actuating chamber adjacent said valve chamber; first detachable wall member having port means defined therein secured on one side of said valve body between said valve chamber and said actuating chamber; second detachable wall member secured on the opposite side of said valve body and having a fluid passage therein; an annular valve seat encircling said passage of said second wall member mounted between facing surfaces of said valve body and said second wall member; first fastening means for securing said first and second wall members on opposite sides of said valve body; a valve member in said valve chamber, movable to open and close against said seat; an elongated valve stem supporting said valve member and extending through said port means into said actuating chamber, said stem having a transverse cross-section approximately the same as the area encircled by a ring of contact between said valve member and seat when closed together; piston means connected to said stem mounted for movement in said actuating chamber between opposite ends for opening and closing said valve member; inlet means for introducing pressurized fluid into at least one end of said actuating chamber for acting on said piston means to move said stem in one direction; biasing means urging said stem in an opposite direction; and manual operator means externally of said actuating chamber for axially moving said stem against the force of said biasing means thereon, said operator means operable to move said stem between a first stable position exerting no force in opposition to said biasing means to maintain said valve member in a fixed position in relation to said valve seat.

2. The valve assembly of claim 1 wherein said first wall member includes opposite side faces around said port means defining wall surfaces of said valve chamber and said actuating chamber.

3. The valve assembly of claim 3 wherein said valve body and said first wall member include a first pair of facing, spaced-apart, annular surfaces in coaxial alignment with said stem and flexible seal means disposed between said first pair of surfaces for sealing engagement with said stem.

4. The valve assembly of claim 3 wherein said first wall member and said actuating chamber include a second pair of facing, spaced-apart, annular surfaces in coaxial alignment with said stem and flexible seal means disposed between said second pair of surfaces for sealing engagement with said stem.

5. The valve assembly of claim 4 wherein said annular surfaces on said valve body and said actuating chamber are defined in annular recesses therein, said first wall member including outwardly projecting bosses on opposite side faces sealed in said recesses.

6. The valve assembly of claim 2 wherein said actuating chamber includes an outer end wall spaced from said first wall member and second removable fastening means extending between said end wall and said first wall member for securing said actuating chamber and said valve chamber together.

7. The valve assembly of claim 6 wherein said actuating chamber includes a tubular side wall forming a cylinder for said piston means and secured between said outer end wall and said first wall member in coaxial alignment with said stem by said second removable fastening means.

* * * * *